United States Patent
Ishibashi (10) Patent No.: US 8,446,629 B2
(45) Date of Patent: May 21, 2013

(54) PRINTER DRIVER, IMAGE FORMING APPARATUS AND PRINT CONTROLLING METHOD

(75) Inventor: Takei Ishibashi, Sagamihara (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 611 days.

(21) Appl. No.: 12/361,656

(22) Filed: Jan. 29, 2009

(65) Prior Publication Data

US 2009/0225353 A1 Sep. 10, 2009

(30) Foreign Application Priority Data

Feb. 1, 2008 (JP) ................................. 2008-022787

(51) Int. Cl.
*G06K 15/00* (2006.01)

(52) U.S. Cl.
USPC ....... 358/1.18; 358/1.12; 358/1.13; 358/1.15; 358/504; 399/53; 399/58; 399/59; 399/60; 399/371; 399/375; 399/385; 399/388; 399/403; 399/407; 399/408; 399/409; 399/410

(58) Field of Classification Search
USPC ........ 358/1.15, 1.18, 1.12, 1.13, 504; 399/53, 399/58, 59, 60, 371, 375, 385, 388, 403, 399/407, 408, 409, 410
See application file for complete search history.

(56) References Cited

U.S. PATENT DOCUMENTS

| | | | | |
|---|---|---|---|---|
| 6,549,299 B1 * | 4/2003 | Allen et al. | ................... | 358/1.18 |
| 6,799,717 B2 * | 10/2004 | Harris | ............................ | 235/375 |
| 7,061,636 B2 * | 6/2006 | Ryan et al. | ................... | 358/1.15 |
| 7,768,667 B2 * | 8/2010 | Hino et al. | ................... | 358/1.15 |

FOREIGN PATENT DOCUMENTS

| | | |
|---|---|---|
| JP | 7-314844 A | 5/1995 |
| JP | 10-202983 | 8/1998 |
| JP | 2007-127774 | 5/2007 |

OTHER PUBLICATIONS

Office Action issued in the corresponding Japanese Patent Application No. 2008-022787 dated Dec. 4, 2009, and an English Translation thereof.

* cited by examiner

*Primary Examiner* — Vu B Hang
(74) *Attorney, Agent, or Firm* — Buchanan Ingersoll & Rooney PC (57) ABSTRACT

There is described an image forming apparatus, which makes it possible to prevent a final print product from getting its appearance worse due to such a drawback that a reference mark still remains on the final print product. The apparatus includes: a setting section to make the display section display a setting screen for inputting setting information therefrom, the setting information being in regard to a post-processing use page including a reference mark to be used for post processing; an image processing section to create image data representing a second image of the post-processing use page, based on the setting information inputted from the setting screen; and a print processing section to print the first images of the pages included in the document and the second image of the post-processing use page onto first paper sheets and a second paper sheet being separate from the first paper sheets, respectively.

20 Claims, 8 Drawing Sheets

42: POST-PROCESSING USE PAGE
43: REFERENCE MARK FOR POST PROCESSING
44: INDEX INFORMATION

FIG. 12 (b)

42: POST-PROCESSING USE PAGE
44: INDEX INFORMATION
43: REFERENCE MARK FOR POST PROCESSING

FIG. 12 (c)

42: POST-PROCESSING USE PAGE
43: REFERENCE MARK FOR POST PROCESSING
44: INDEX INFORMATION

PRINTER DRIVER, IMAGE FORMING APPARATUS AND PRINT CONTROLLING METHOD

This application is based on Japanese Patent Application NO. 2008-022787 filed on Feb. 1, 2008, with Japan Patent Office, the entire content of which is hereby incorporated by reference.

BACKGROUND OF THE INVENTION

The present invention relates to a printer driver, an image forming apparatus and a print controlling method.

In recent years, there have been increasingly proliferated in the market various kinds of printing apparatuses, each provided with a printer function, a scanner function, etc., (hereinafter, referred to as an image forming apparatus as a general term for each of them). Most of the above kinds of image forming apparatuses are provided with a function for putting a plurality of pages (for instance, two or four pages) together into a single one of paper sheets (hereinafter, referred to as an intensive function). When print products are produced by employing the abovementioned intensive function, the printed paper sheets are usually folded two or cut to finish the print products. Accordingly, in order to make it possible to perform the folding processing and/or the cutting processing at an accurate position, there has been employed such a method that a mark serving as a reference mark when the printed paper sheets are folded and/or cut (hereinafter, referred to as a post processing reference mark) is printed onto each of the paper sheets.

However, when the post processing reference mark is printed onto all of the paper sheets, post processing reference marks, which are respectively printed onto the second paper sheet and each of paper sheets after the second paper sheet, and which are not used for the folding processing and/or the cutting processing, still remain on the corresponding pages of the finished print product. Accordingly, there has been a problem that the abovementioned fact makes the appearance of the finished print product worse. To solve such the problem, Tokkaihei 7-314844 (Japanese Non-Examined Patent Publication) sets forth a printing apparatus that is provided with: a first page detecting section to detect the first page among the consecutive printing paper sheets; and a register mark printing section to print the register mark onto the first page of the printing paper sheets, detected by the first page detecting section.

By employing the method set forth in Tokkaihei 7-314844 abovementioned, it is possible to solve such the problem that the post processing reference marks still remain on the corresponding pages of the finished print product. However, since the post processing reference mark, printed on any one of the two pages created by folding or cutting the first paper sheet, still remains thereon, there has arisen another problem that it is still impossible to prevent the finished print product from deteriorating its appearance quality.

SUMMARY

To overcome the abovementioned drawbacks in conventional printing systems, it is one of objects of the present invention to provide a printer driver, an image forming apparatus and a print controlling method, each of which makes it possible not only to easily implement the post processing operations, such as a fold processing, a cut processing, etc., but also to prevent a final print product from getting its appearance worse due to such a drawback that a reference mark still remains on the final print product.

Accordingly, at least one of the objects of the present invention can be attained by any one of the print controlling methods described as follows.

(1) According to a print controlling method reflecting an aspect of the present invention, the print controlling method to be employed in a printing system that includes a control apparatus and an image forming apparatus, both of which are coupled to each other through a communication network, comprises: displaying a setting screen on a display section provided in the control apparatus, the setting screen being for inputting therefrom setting information in regard to a post-processing use page including a reference mark to be used for post processing; creating print data that includes data describing images of pages included in a document that serves as a printing object and the setting information inputted from the setting screen; transmitting the print data from the control apparatus to the image forming apparatus through the communication network; generating first image data representing first images to be printed on the pages included in the document and second image data representing a second image to be printed on the post-processing use page, based on the print data transmitted from the control apparatus to the image forming apparatus; and printing the first images of the pages included in the document, based on the first image data, and the second image of the post-processing use page, based on the second image data, onto first paper sheets and a second paper sheet being separate from the first paper sheets, respectively.

(2) According to another aspect of the present invention, in the print controlling method recited in item 1, the setting screen includes a column for determining whether or not the post-processing use page should be outputted and another column for selecting an output position at which the post-processing use page is to be outputted.

(3) According to still another aspect of the present invention, in the print controlling method recited in item 1 or 2, the post-processing use page includes information illustrating that a current page itself is the post-processing use page.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

In the preferred embodiment of the present invention, a controlling apparatus for controlling an image forming apparatus is provided with at least a setting section and a print data creating section, each of which is configured as either hardware or software (printer driver). When making a display section display a screen (for instance, a printer driver setting screen) on which user-settable items are displayed by executing the printer driver, the setting section also make the display section display the setting items in regard to a page to be used for post processing (hereinafter, also referred to as a post-processing use page), so as to make it possible for the user to conduct setting operations in regard to the post-processing use page. Further, the print data creating section creates print data to which setting information for the post-processing use page is attached. Still further, based on the print data, the image forming apparatus prints images to be printed on the document pages and another image to be printed on the post-processing use page onto paper sheets and anther paper sheet being separate from the paper sheets, respectively.

Then, by superposing the post-processing use page on the bunch of document pages, it becomes possible to conduct various post processing, such as a fold processing, a cut processing, etc., at an accurate position. After the post processing is completed, by removing the post-processing use page from the bunch of paper sheets concerned, it becomes possible to prevent the final print products from getting its appearance worse, since no reference mark remains on any one of the document pages.

<Embodiment 1>

Figure 1:
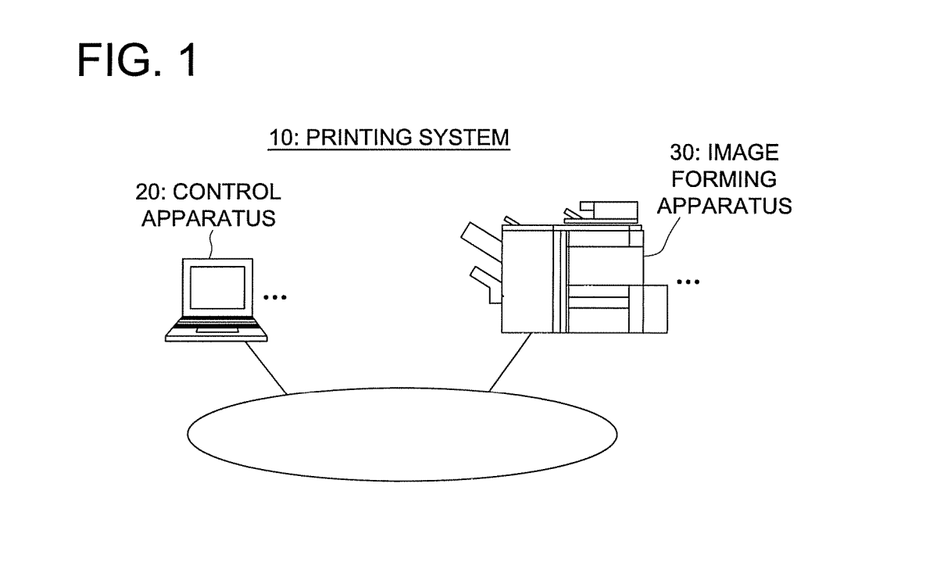
FIG. 1 shows a schematic diagram of a configuration of a printing system embodied in the present invention as EMBODIMENT 1.
Figure 2:
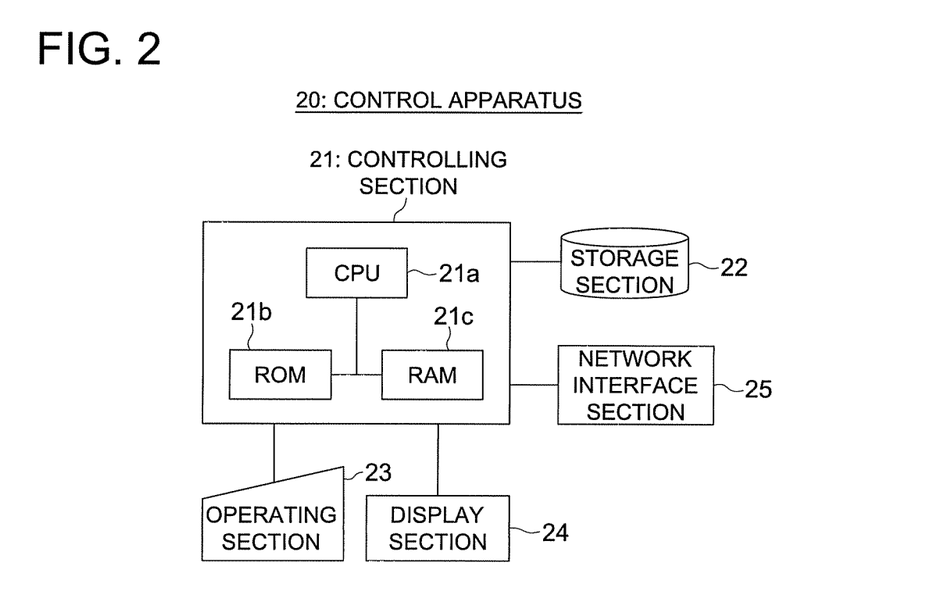
FIG. 2 shows a block diagram indicating a configuration of a controlling apparatus embodied in the present invention as EMBODIMENT 1.
Figure 3:
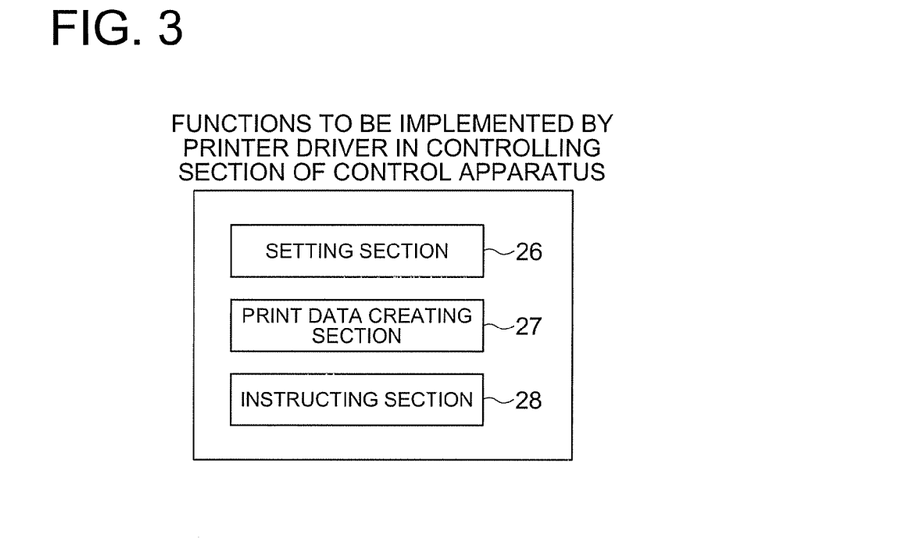
FIG. 3 shows a block diagram indicating functions to be implemented by a printer driver embodied in the present invention as EMBODIMENT 1.
Figure 4:
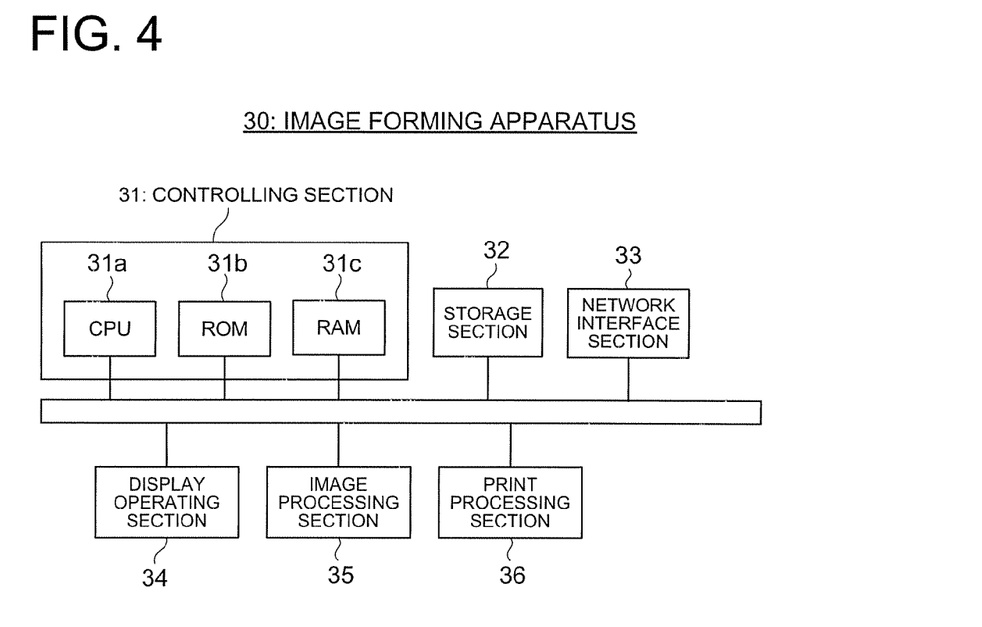
FIG. 4 shows a block diagram indicating a configuration of an image forming apparatus embodied in the present invention as EMBODIMENT 1.
Figure 5:
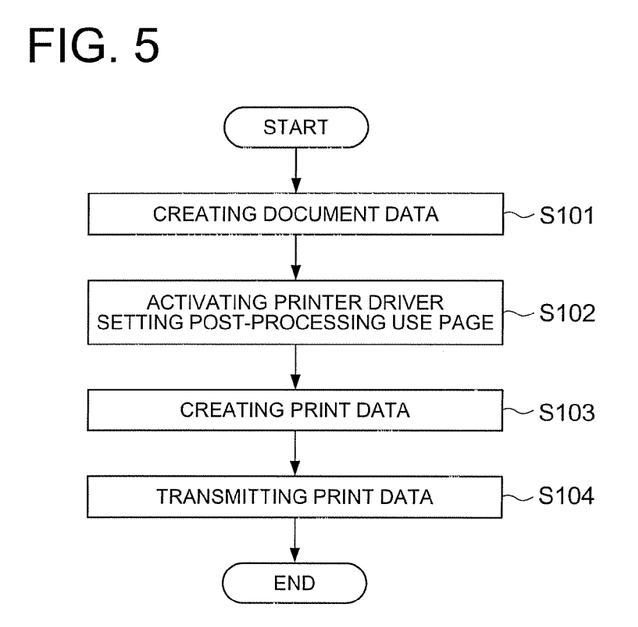
FIG. 5 shows a flowchart of controlling procedures to be conducted by a controlling apparatus embodied in the present invention as EMBODIMENT 1.
Figure 6:
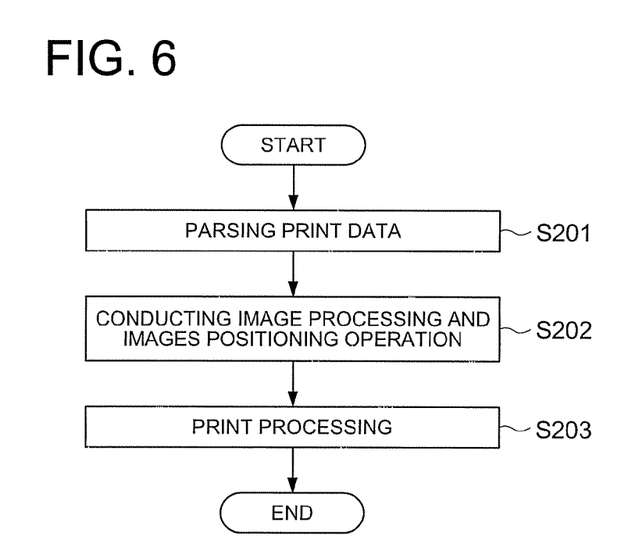
FIG. 6 shows a flowchart indicating operations to be conducted by an image forming apparatus embodied in the present invention as EMBODIMENT 1.
Figure 7:
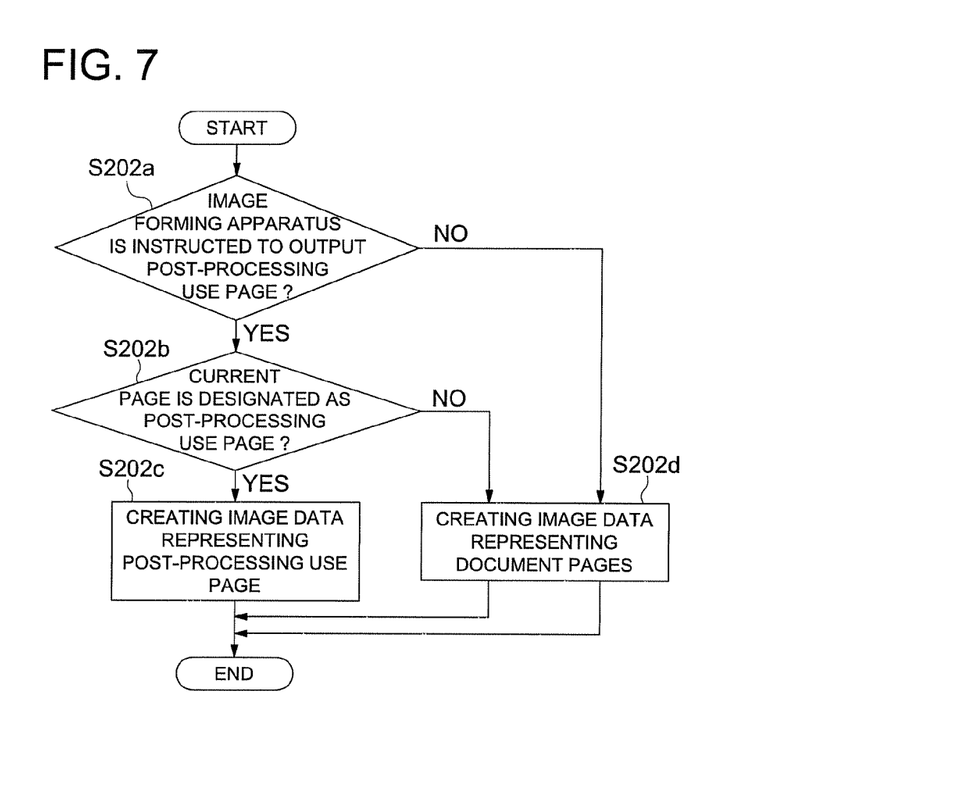
FIG. 7 shows a flowchart indicating image processing procedures to be conducted by an image forming apparatus embodied in the present invention as EMBODIMENT 1.
Figure 8:
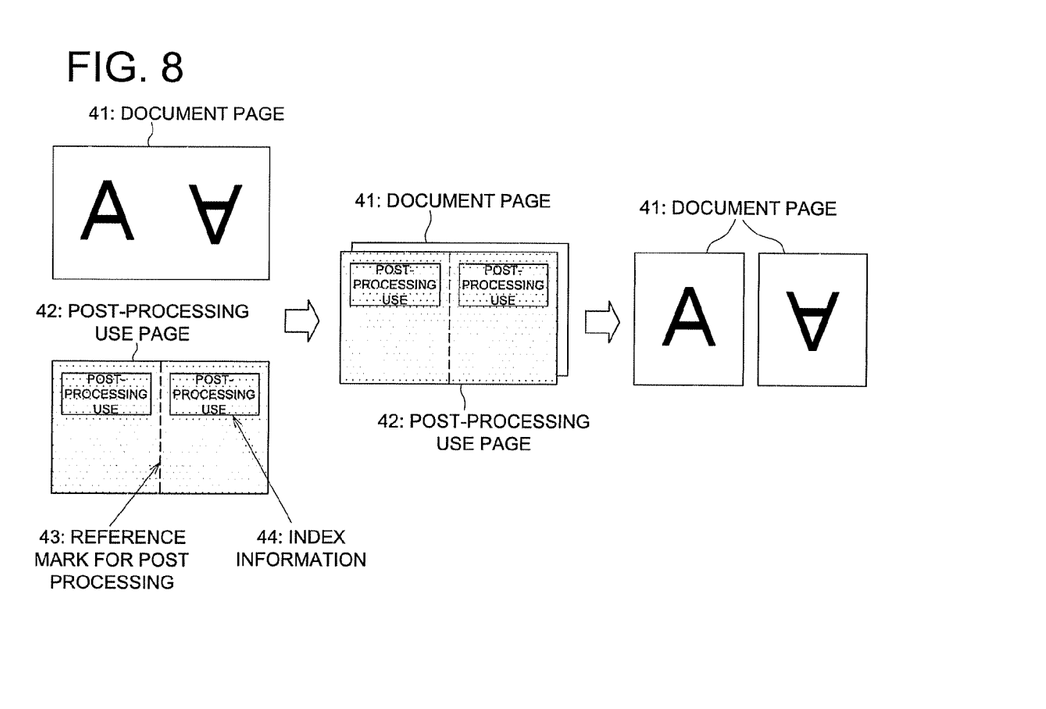
FIG. 8 shows a schematic diagram indicating a print controlling method embodied in the present invention as EMBODIMENT 1.
Figure 9:
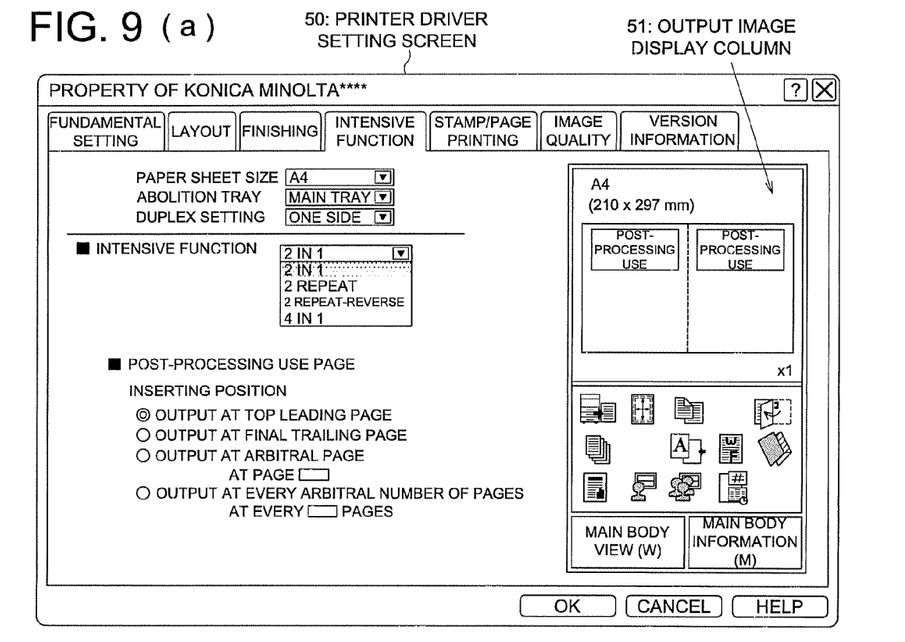
FIG. 9(a) and FIG. 9(b) show exemplary configurations of a screen (printer driver setting screen) to be displayed on a display section of a controlling apparatus embodied in the present invention as EMBODIMENT 1.
Figure 10:
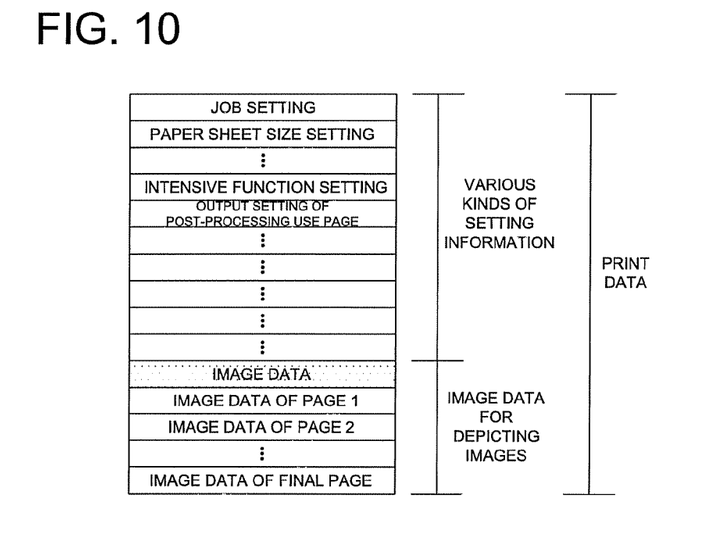
FIG. 10 shows an exemplary structure of print data to be employed in a printing system embodied in the present invention as EMBODIMENT 1.
Figure 11:
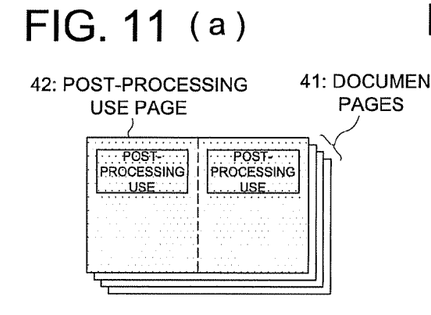
FIG. 11(a), FIG. 11(b) and FIG. 11(c) show exemplary configurations of print products to be produced in a printing system embodied in the present invention as EMBODIMENT 1.
Figure 12:
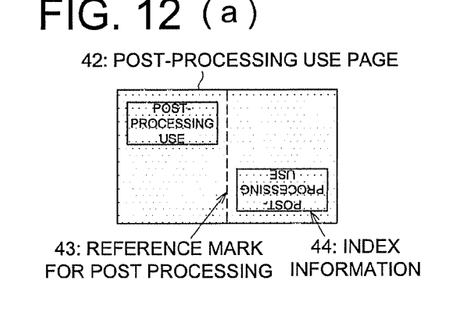
FIG. 12(a), FIG. 12(b) and FIG. 12(c) show exemplary configurations of various post-processing use pages to be produced in a printing system embodied in the present invention as EMBODIMENT 1.

In order to describe the preferred embodiment of the present invention in detail, referring to FIG. 1 through FIG. 12, a printer driver, an image forming apparatus and a print controlling method, embodied in the present invention as EMBODIMENT 1, will be detailed in the following. FIG. 1 shows a schematic diagram of a configuration of the printing system embodied in the present invention, FIG. 2 shows a block diagram indicating a configuration of a controlling apparatus, FIG. 3 shows a block diagram indicating functions to be implemented by the printer driver, and FIG. 4 shows a block diagram indicating a configuration of the image forming apparatus. Further, FIG. 5, FIG. 6 and FIG. 7, show flowcharts indicating the print controlling method to be employed in the printing system embodied in the present invention. Still further, FIG. 8 shows a schematic diagram indicating processing procedures of the print controlling method embodied in the present invention. Still further, FIG. 9(a) and FIG. 9(b) show exemplary configurations of screens to be displayed on a display section of the controlling apparatus, and FIG. 10 shows a structure of the print data. Yet further, FIG. 11(a), FIG. 11(b) and FIG. 11(c) show exemplary structures of various print products, and FIG. 12(a), FIG. 12(b) and FIG. 12(c) show exemplary configurations of various pages for post processing use.

As shown in FIG. 1, a printing system 10, embodied in the present invention, is constituted by: a single or a plurality of client terminal devices (hereinafter, referred to as control apparatus 20), each of which instructs an image forming apparatus to conduct the operation for printing the document created by using a document creation application program; and a single or a plurality of image forming apparatus 30, such as a printer, a digital compound apparatus (or a multi-functioned apparatus), etc., each of which implements the printing operation, based on the instructions sent from the control apparatus 20. The single or the plurality of control apparatus 20 and the single or the plurality of image forming apparatus 30 are coupled to each other through a communication network, such as a LAN (Local Area Network), a WAN (Wide Area Network), etc.

Further, as shown in FIG. 2, the control apparatus 20 is provided with a controlling section 21, a storage section 22, an operating section 23, a display section 24, a network interface section 25, etc.

The controlling section 21 is constituted by a CPU (Central Processing Unit) 21a, a ROM (Read Only Memory) 21b, a RAM (Random Access Memory) 21c, etc., so as to read out various kinds of programs, such as an OS (Operating System), an application program for creating a document, a printer driver for controlling the image forming apparatus 30, etc., from the ROM 21b and/or the storage section 22 to develop them on the RAM 21c. Then, the CPU 21a executes the programs developed on the RAM 21c.

The storage section 22 is constituted by an HDD (Hard Disc Drive), etc., so as to store various kinds of programs and data therein.

The operating section 23 is constituted by a keyboard, a mouse, etc., so as to make it possible to conduct operations for setting various kinds of items in regard to a document creation and a printing.

The display section 24 is constituted by a LCD (Liquid Crystal Display), etc., so as to display various kinds of screens, such as a printer driver setting screen detailed later, etc.

The network interface section 25 is constituted by a NIC (Network Interface Card), a modem, etc., so as to make it possible to communicate with the image forming apparatus 30.

Further, as shown in FIG. 3, the abovementioned printer driver makes the controlling section 21 of the control apparatus 20 serve as a setting section 26, a print data creating section 27, an instructing section 28, etc.

The setting section 26 makes the display section 24 display a screen (hereinafter, referred to as a printer driver setting screen), so that the user can conduct operations for setting user-settable items for the image forming apparatus 30. The abovementioned user-settable items includes setting items in regard to the paper sheets, such as a paper sheet feeding tray, a selection of a kind of paper sheet, etc., and in regard to the post processing, such as the intensive function, the page for post processing use, etc. In this connection, hereinafter, the page for post processing use is defined as such a page that includes no document information to be created by using the document creation application program, but a reference mark for post processing use, such as a cutting line, a register mark, etc., and information for indicating that the concerned page is exclusively used for the post processing (for instance, such as a title of "POST PROCESSING USE ONLY", etc.), that are printed thereon.

The print data creating section 27 creates data (hereinafter, referred to as print data) that is structured by image data for every page and setting information in regard to the various kinds of abovementioned items and is written in the format of the PDL (Page Description Language). On that occasion, in the present embodiment, setting information in regard to the pages for post processing use is included in the abovementioned setting information.

The instructing section 28 transmits the print data created by the print data creating section 27 to the image forming apparatus 30, in order to instruct the image forming apparatus 30 to conduct various kinds of processing based on the setting information concerned.

In this connection, although the personal computer serves as the control apparatus 20 in the configuration shown in FIG. 1, the scope of the control apparatus 20 is not limited to the personal computer. Any kind of apparatus can be employed as the control apparatus 20, as far as the control apparatus 20 is capable of controlling the image forming apparatus 30. Further, although the printer driver serves as the setting section 26, the print data creating section 27 and the instructing section 28 in the configuration shown in FIG. 3, it is also applicable that at least one of them is structured as hardware to be provided in the control apparatus 20.

On the other hand, as shown in FIG. 4, the image forming apparatus 30 is constituted by a controlling section 31, a storage section 32, a network interface section 33, a display operating section 34, an image processing section 35, a print processing section 36, etc., which are coupled to each other through a bus.

The controlling section 31 is constituted by a CPU 31a, a ROM 31b, a RAM 31c, etc., so as to read out various kinds of programs from the ROM 31b and/or the storage section 32 to develop them on the RAM 31c. Then, the CPU 31a executes the programs developed on the RAM 31c.

The storage section 32 is constituted by an HDD, etc., so as to store the programs for controlling the operations to be conducted in the image forming apparatus 30 and the print data acquired from the control apparatus 20.

The network interface section 33 is constituted by a NIC, a modem, etc., so as to make it possible to communicate with the control apparatus 20. In the present embodiment, the network interface section 33 receives the print data, etc., sent from the control apparatus 20.

The display operating section 34 is constituted by a display section, such as a LCD (Liquid Crystal Display), etc., and an operating section, such as a touch panel that covers the display section, etc., so as to display an icon and/or a key button on the LCD, etc., and to output operational signals inputted from the touch panel, etc., to the CPU 31a. In this connection, the display operating section 34 may be structured as either an integrated single section or a combination of the display section and the operating section separately provided.

The image processing section 35 parses the print data received from the control apparatus 20 so as to create image data for each of the pages, and further, creates the image data for the pages to be used for the post processing. Further, according to the instruction included in the print data, the image processing section 35 applies various kinds of image processing, such as a color conversion processing, a density adjustment processing, etc., to the created image data, as needed.

Based on the image data generated by the image processing section 35, the print processing section 36 prints the document information and the post processing information onto the paper sheets corresponding to the pages on which the document information is to be printed (hereinafter, referred to as document pages) and onto the other paper sheets corresponding to the other pages on which the post processing information is to be printed (hereinafter, referred to as post-processing use pages), respectively, in a predetermined order. On that occasion, it is preferable that the size of the paper sheets on which the document pages are to be printed is the same as those on which the post-processing use pages are to be printed.

In this connection, the configuration of the image forming apparatus 30 embodied in the present invention, shown in FIG. 4, is merely an example among various kinds of image forming apparatuses applicable for the present invention. Any kind of an image forming apparatus is applicable in the present invention, as far as both the document pages and the post-processing use pages are printable according to the instructions issued by the control apparatus 20. For instance, it is applicable that various kinds of functional constituents, such as an ADF (Automatic Document Feeder), a document reading section, etc., are added to the image forming apparatus 30. Further, although the image forming apparatus 30 includes the image processing section 35 in the present embodiment, it is also applicable that the processing operations to be conducted in the image processing section 35 are conducted in a RIP (Raster Image Processor) controller, etc., coupled to the image forming apparatus 30 through the communication network.

The print controlling method to be employed in the printing system 10 configured as mentioned in the above will be detailed in the following.

Initially, referring to the flowchart shown in FIG. 5, the operations to be conducted by the control apparatus 20 embodied in the present invention will be detailed in the following.

In response to the operations conducted by the user, the controlling section 21 reads out the application program for creating a document from the ROM 21b or the storage section 22 to activate the application program. Then, the user creates document data representing images to be printed by using the document creation application program concerned (Step S101). In this connection, the scope of document data is not limited to the document data created in the above. It is also applicable that the document data created in advance is acquired from the ROM 21b or the storage section 22, or another computer terminal device, a server, etc., each of which is coupled to the control apparatus 20 through the communication network.

Successively, the user conducts predetermined operations on the screen displayed by the document creation application program concerned, so that the controlling section 21 activates the printer driver to make the printer driver (setting section 26) display a printer driver setting screen 50, as shown in FIG. 9(a), on the display section 24 (Step S102). On this printer driver setting screen 50, user-settable items to be inputted from the printer driver are categorized into tabs and displayed thereon. Accordingly, for instance, by clicking the "INTENSIVE FUNCTION" tab, a column for selecting one of various kinds of intensive function modes including a 2-in-1 mode, a 2-repeat mode, a 2-repeat-reverse mode, a 4-in-1 mode, etc., another column for determining whether or not the post-processing use page should be outputted, still another column for selecting a position at which the post-processing use page is to be outputted, an output image display column 51 for displaying an image to be outputted on the post-processing use page, etc., are displayed on the printer driver setting screen 50. Then, the user operates the operating section 23 so as to establish the setting items in regard to the intensive function and the post-processing use page from the screen.

For instance, the user clicks the radio button titled "INTENSIVE FUNCTION", shown in FIG. 9(*a*) and FIG. 9(*b*), to select a desired one of the intensive functions indicated in the pull-down menu. Successively, the user clicks the other radio button titled "POST-PROCESSING USE PAGE OUTPUT" to select the position at which the post-processing use page is to be inserted. Then, the reference mark for post processing use is displayed at a position suitable for the intensive function selected by the user and information representing the post-processing use page is also displayed as needed.

Concretely speaking, when the user selects the 2-in-1 mode as the intensive function as shown in FIG. 9(*a*), an image of post-processing use page, in which a reference mark for post processing use is arrange at such a position that the reference mark divides the paper sheet into two areas, and a title of "POST-PROCESSING USE PAGE" is arranged in each of the divided two areas, is displayed within the output image display column 51. Further, when the user selects the 4-in-1 mode as the intensive function as shown in FIG. 9(*b*), another image of post-processing use page, in which reference marks for post processing use are arrange at such positions that the reference marks divide the paper sheet into four areas, and a title of "POST-PROCESSING USE PAGE" is arranged in each of the divided four areas, is displayed within the output image display column 51. In this connection, the printer driver setting screen 50, shown in FIG. 9(*a*) and FIG. 9(*b*), is merely an example among various variations, and the scope of the present invention is not limited to the above. Any kind of screen layout and contents of each of the items indicated by clicking each tab may be applicable in the present invention, as far as the intensive function and the setting items of the post-processing use page are settable for the user.

Successively, when the user clicks the OK button after setting the intensive function and the post-processing use page, the printer driver (print data creating section 27) converts the document data to print data written in the Page Description Language to create the print data (Step S103). For instance, the created print data has a structure shown in FIG. 10, and is constituted by various kinds of setting information and description data to be used for depicting images (hereinafter, referred to as image depicting description data), and the image depicting description data is constituted by plural sets of description data, provided for each of the pages. Further, the various kinds of setting information is constituted by fundamental setting information, such as setting of job, setting of paper sheet size, etc., the other setting information in regard to the intensive function, still the other setting information in regard to the post-processing use page, both established in Step S102, etc.

Yet successively, the printer driver (instructing section 28) transmits the print data, which is created by the print data creating section 27, to the image forming apparatus 30 through the network interface section 25 (Step S104).

Next, referring to the flowcharts shown in FIG. 6 and FIG. 7, the operations to be conducted in the image forming apparatus 30, embodied in the present invention, will be detailed in the following.

Initially, the controlling section 31 of the image forming apparatus 30 receives the print data sent from the control apparatus 20 through the network interface section 33 (Step S201).

Successively, the image processing section 35 parses the print data sent from the control apparatus 20, so as to create image data representing the document pages and the post-processing use page, and further, applies various kinds of image processing, such as a color conversion processing, a density adjustment processing, etc., as needed. After that, the image processing section 35 performs the operation for positioning the images, represented by the created image data, onto each of the pages (Step S202).

Referring to the flowchart shown in FIG. 7, the Step S202 will be further detailed in the following. By referring to the setting information for the post-processing use page among the various kinds of setting information included in the print data, the image processing section 35 determines whether or not the image forming apparatus 30 is instructed to output the post-processing use page (Step S202*a* shown in FIG. 7).

When determining that the image forming apparatus 30 is instructed to output the post-processing use page (Step S202*a*; Yes), the image processing section 35 further determines whether or not the concerned page is designated as the post-processing use page (Step S202*b*).

When determining that the concerned page is designated as the post-processing use page (Step S202*b*; Yes), the image processing section 35 generates the image data representing the image that is to be printed on the post-processing use page and includes the reference mark corresponding to the intensive function selected by the user, and the information indicating the post-processing use page as needed (Step S202*c*).

On the other hand, when determining that the image forming apparatus 30 is not instructed to output the post-processing use page (Step S202*a*; No), and/or, when determining that the concerned page is not designated as the post-processing use page (Step S202*b*; No), the image processing section 35 generates the image data representing the image that is to be printed on the document page (Step S202*d*). Successively, the abovementioned process is implemented for every one of all pages.

Still successively, returning to the flowchart shown in FIG. 6, based on the image data outputted by the image processing section 35, the print processing section 36 prints the images of the document pages and the other image for the post-processing use page onto the paper sheets and the separate paper sheet, respectively, so as to output the document pages and the post-processing use page separately from each other (Step S203).

Concretely speaking, when the intensive function is set at any one of the 2-in-1 mode, the 2-repeat-reverse mode, etc., (herein, the 2-repeat-reverse mode is selected) from the printer driver setting screen 50 as shown in the left side of FIG. 8, the print processing section 36 outputs each of document pages 41, in which the same document images are respectively arranged on the left and right pages divided two while reversing directions of them relative to each other, and a post-processing use page 42 in which a reference mark 43 to be used for the post processing, such as a cutting mark, etc., is printed at the center of the paper sheet, and index information 44 indicating that the concerned page is the post-processing use page, such as the title of "POST-PROCESSING USE PAGE", etc., is printed on the both areas divided by the reference mark 43.

Further, for instance, when the "OUTPUT AT TOP LEADING PAGE" is selected as the inserting position of the post-processing use page from the column of "POST-PROCESSING USE PAGE OUTPUT", the print processing section 36 outputs the post-processing use page 42 at the top leading page, as shown in FIG. 11(*a*). Still further, when the "OUTPUT AT ARBITRAL PAGE" is selected as the inserting position, the print processing section 36 outputs the post-processing use page 42 at the designated page, as shown in FIG. 11(*b*). Yet further, when the "OUTPUT AT EVERY ARBITRAL NUMBER OF PAGES" is selected as the inserting position, the print processing section 36 outputs the post-processing use page 42 at every designated number of pages (for instance, at every 50 pages), as shown in FIG. 11(*c*).

In this connection, the scope of the printing layout of the post-processing use page 42 is not limited to the example shown in FIG. 8. For instance, when the intensive function is set at the 2-repeat-reverse mode, it is also applicable that two of the index information 44, to be respectively printed in the both areas divided by the reference mark 43, are printed in such a manner that direction of them are reversed relative to each other, as shown in FIG. 12(*a*). Further, it is also applicable that a pair of register marks (triangle-shaped marks) is printed as the reference mark 43, as shown in FIG. 12(*b*). Still further, when it is necessary to cut the circumferential area of the paper sheet concerned, it is also applicable that a kind of frame mark is additionally printed on the post-processing use page 42, as shown in FIG. 12(*c*). Yet further, the reference mark 43 for the post processing use is not necessary arranged at a position that divides the paper sheet equally.

After that, as shown in the center portion of FIG. 8, the user superposes the post-processing use page 42 on the document pages 41, so as to conduct a desired post processing, such as a fold processing, a cut processing, etc., along the reference mark 43 for post processing use, printed on the post-processing use page 42. After the post processing is completed, by removing the post-processing use page 42 from the bunch of paper sheets concerned, the print products that only includes the document pages 41, on none of which the reference mark 43 remains, can be obtained as shown in the right side portion of FIG. 8.

As described in the foregoing, according to EMBODIMENT 1, the printer driver (setting section 26) displays the setting screen for setting the items in regard to the post-processing use page on the printer driver setting screen 50. Further, the printer driver (print data creating section 27) creates the print data attached with the setting information of the post-processing use page. Accordingly, the image forming apparatus can respectively print the document pages 41 and the post-processing use page 42 on the paper sheets and the other paper sheet being separate from each other. Therefore, it becomes possible not only to accurately implement the post processing operations, such as a fold processing, a cut processing, etc., by using the post-processing use page 42, but also to prevent the final print products from getting its appearance worse, by removing the post-processing use page 42 form the bunch of paper sheets concerned after the post processing is completed.

<Embodiment 2>

Figure 13:
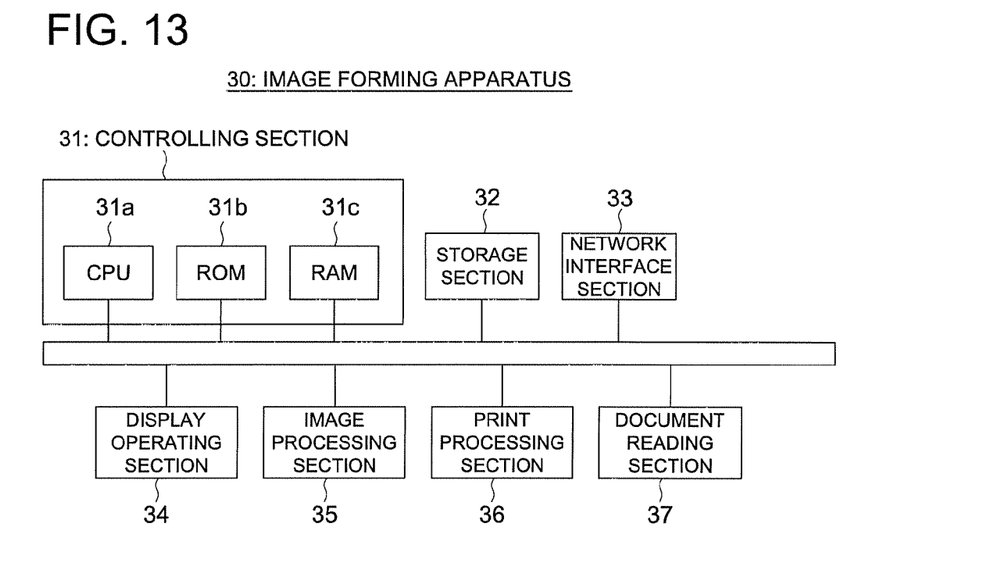
FIG. 13 shows a block diagram indicating a configuration of an image forming apparatus embodied in the present invention as EMBODIMENT 2.
Figure 14:
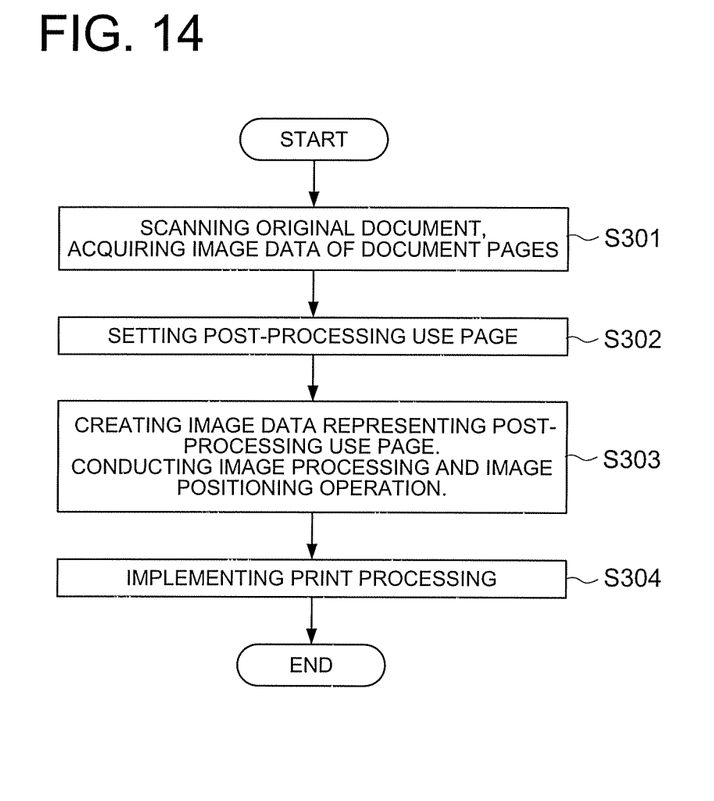
FIG. 14 shows a flowchart indicating operations to be conducted by an image forming apparatus embodied in the present invention as EMBODIMENT 2.

Next, referring to FIG. 13 and FIG. 14, the image forming apparatus and the print controlling method embodied in the present invention as EMBODIMENT 2, will be detailed in the following. FIG. 13 shows a block diagram indicating a configuration of an image forming apparatus of EMBODIMENT 2, while FIG. 14 shows a flowchart indicating operations to be conducted in the image forming apparatus of EMBODIMENT 2.

Although the case in which the setting operation of the post-processing use page 42 is conducted at the time when the control apparatus 20 instructs the image forming apparatus 30 to perform the printing operations of the document (in other words, the image forming apparatus 30 serves as a network printer) is exemplified in EMBODIMENT 1 described in the foregoing, it is possible to output the post-processing use page as well, even in the case that the print product is created and outputted in the intensive function mode, based on the image data read from the original document by the document reading section of the image forming apparatus 30.

In that case, in addition to the constituents included in the configuration of the EMBODIMENT 1 shown in FIG. 4, the image forming apparatus 30 further includes a document reading section 37 that is constituted by a light source for scanning the document, a CCD (Charge Coupled Device) image sensor for converting a light reflected from the document to electric signals and an analogue to digital converter for converting analogue signals to digital signals, etc., as shown in FIG. 13. Further, the controlling section 31 also serves as a setting section to make the display operating section 34 display a screen for setting the items in regard to the intensive function and the post-processing use page.

In this connection, it is applicable that the abovementioned setting section is configured as either hardware or a control program to be executed on the image forming apparatus 30 by a computer, so as to function the computer as the setting section.

Next, referring to the flowchart shown in FIG. 14, the operations to be conducted by the image forming apparatus 30 embodied in the present invention as EMBODIMENT 2, will be detailed in the following.

Initially, when the user operates the display operating section 34 to input an instruction for reading an original document, the document reading section 38 scans the original document to acquire image data of images respectively printed on the pages included in the original document (Step S301). In this connection, it is also applicable to read out the document data stored in advance in the storage section 32, etc., instead of scanning the original document.

Successively, the setting section of the controlling section 31 makes the display operating section 34 display the setting screen for setting the items in regard to the intensive function and the post-processing use page (Step S302). Although the layout of the setting screen may be arbitrarily established, the setting screen can be constituted by a column for selecting one of the intensive functions, such as the 2-in-1 mode, the 2-repeat mode, the 2-repeat-reverse mode, the 4-in-1 mode, etc., another column for determining whether or not post-processing use page should be outputted, still another column for selecting the output position of the post-processing use page, still another column for displaying a current output image of the post-processing use page, etc., as well as the screen layout shown in FIG. 9(*a*) and FIG. 9(*b*). Then, the user operates the display operating section 34 to set the various kinds of items in regard to the intensive function and the post-processing use page Still successively, the image processing section 35 creates image data representing an image of the post-processing use page, based on the setting items established for the post-processing use page (Step S303), and applies various kinds of image processing, such as the color conversion processing, the density adjustment processing, etc., to the image data of the document pages acquired in Step S301 and the other image data of the post-processing use page created in Step S303, as needed. After that, the image processing section 35 performs the operation for positioning the images, represented by the created image data, onto each of the pages (Step S303).

Still successively, based on the image data outputted by the image processing section 35, the print processing section 36 prints the images of the document pages and the other image for the post-processing use page onto the paper sheets and the separate paper sheet, respectively, in the designated order (Step S304).

After that, the user conducts a desired post processing, such as a fold processing, a cut processing, etc., along the reference mark for post processing use, printed on the post-processing use page. After the post processing is completed, by removing the post-processing use page from the bunch of paper sheets concerned, the print products that only includes the document pages, on none of which the reference mark remains, can be obtained.

As described in the foregoing, according to EMBODIMENT 2, the setting section of the image forming apparatus 30 makes the display operating section 34 display the setting screen for setting the items in regard to the post-processing use page, so as to print the post-processing use page 42 according to the setting information concerned. Therefore, it becomes possible not only to accurately implement the post processing operations, such as a fold processing, a cut processing, etc., by using the post-processing use page 42, but also to prevent the final print product from getting its appearance worse, by removing the post-processing use page 42 form the bunch of paper sheets concerned after the post processing is completed.

In this connection, the two cases in which the reference mark 43 to be used for the post processing and the index information 44 are printed on the post-processing use page 42, as needed, are exemplified in EMBODIMENT 1 and EMBODIMENT 2 aforementioned. However, since the post-processing use page 42 is removed from the bunch of paper sheets after the post processing is completed, it is also possible to print arbitral information or message onto the post-processing use page 42. For instance, it is applicable that information in regard to the handling of the post-processing use page 42 and/or other information in regard to the structure of the document pages 41 and handling of the document pages 41, etc., are printed on the post-processing use page 42.

Further, the case in which the cutting line and the pair of register marks (triangular-shaped marks) are printed on the post-processing use page 42 as the reference mark to be used for the post processing, is exemplified in each of EMBODIMENT 1 and EMBODIMENT 2 aforementioned. The scope of the present invention is neither limited to EMBODIMENT 1 nor limited to EMBODIMENT 2. Any kind of arbitral figures, symbols, letters, etc., can be printed on the post-processing use page as the reference mark to be used for the post processing.

Further, although the printing system, described in the aforementioned embodiments, is so constituted that the post-processing use page 42 is outputted at the time when the document is printed in the intensive function mode, it is also applicable that the post-processing use page 42 is outputted as well as the above, even when the document is printed in a mode other than the intensive function mode, since, sometimes, the edge portion of the document pages 41 is to be folded or cut in the post processing.

The present invention is available for the printer driver to be executed in the control apparatus, an image forming apparatus to implement the printing operations and a print controlling method to be employed in the printing system including the control apparatus and the image forming apparatus, abovementioned.

According to a printer driver, an image forming apparatus and a print controlling method, each embodied in the present invention, it becomes possible not only to accurately implement the post processing operations, such as a fold processing, a cut processing, etc., but also to prevent the final print products from getting its appearance worse due to the fact that a reference mark to be used for post processing still remains on the final print product.

This is because, the setting section (printer driver) of the control apparatus makes the display section display the setting screen, for conducting setting operations in regard to the post-processing use page including the reference mark to be used for the post processing, within the printer driver setting screen, so as to make it possible for the user to input the setting items in regard to the post-processing use page from the setting screen; and since the print data creating section (printer driver) creates print data that includes both the setting information for the post-processing use page and the image data representing each of the pages of the document serving as the printing object, the image forming apparatus that receives the print data can print the images to be printed on the document pages and the other image to be printed on the post-processing use page, onto the paper sheets and the other paper sheet being separate from the paper sheets, respectively, based on the print data.

Further, this is because, since the setting section of the image forming apparatus makes the display section display the setting screen for conducting setting operations in regard to the post-processing use page including the reference mark to be used for the post processing, so as to make it possible for the user to input the setting items in regard to the post-processing use page from the setting screen, it becomes possible for the image forming apparatus to print the images to be printed on the document pages and the other image to be printed on the post-processing use page, onto the paper sheets and the other paper sheet being separate from the paper sheets, respectively.

While the preferred embodiments of the present invention have been described using specific term, such description is for illustrative purpose only, and it is to be understood that changes and variations may be made without departing from the spirit and scope of the appended claims.

What is claimed is:

1. A nontransitory computer readable storage medium storing printer driver software, serving as a computer executable program to be executed by an apparatus that transmits print data to an image forming apparatus, the program being executable by a computer to cause the computer to perform a process comprising:
   displaying a setting screen on a display section, the setting screen being for inputting therefrom setting information in regard to a post-processing use page including a reference mark to be used for post processing, wherein the reference mark is positioned in a location identifying where post processing is to be conducted on document pages separate from the post-processing use page;
   creating print data that includes data describing images of the document pages that serves as a printing object and the setting information inputted from the setting screen; and
   outputting the print data to the image forming apparatus;
   wherein the print data includes first images of the document pages for printing onto first paper sheets, and second images of the post-processing use page for printing onto a second paper sheet being separate from the first paper sheets.

2. The computer readable storage medium of claim 1, wherein the setting screen includes a column for determining whether or not the post-processing use page should be outputted and another column for selecting an output position at which the post-processing use page is to be outputted.

3. The computer readable storage medium of claim 1, wherein the post-processing use page includes information illustrating that a current page itself is the post-processing use page.

4. An image forming apparatus, comprising:
    an image reading section to read an image on each of a plurality of document pages that serves as a printing object, so as to generate first image data representing first images to be printed on the document pages;
    a display section to display various kinds of user-settable screens;
    a setting section to make the display section display a setting screen for inputting setting information therefrom, the setting information being in regard to a post-processing use page including a reference mark to be used for post processing, wherein the reference mark is positioned in a location identifying where post processing is to be conducted on the document pages which are separate from the post-processing use page;
    an image processing section to create second image data representing a second image to be printed on the post-processing use page, based on the setting information inputted from the setting screen; and
    a print processing section to print the first images of the document pages, based on the first image data, and the second image of the post-processing use page, based on the second image data, onto first paper sheets and a second paper sheet being separate from the first paper sheets, respectively.

5. The image forming apparatus of claim 4, wherein the setting screen includes a column for determining whether or not the post-processing use page should be outputted and another column for selecting an output position at which the post-processing use page is to be outputted.

6. The image forming apparatus of claim 4, wherein the post-processing use page includes information illustrating that a current page itself is the post-processing use page.

7. A print controlling method to be employed in a printing system that includes a control apparatus and an image forming apparatus, both of which are coupled to each other through a communication network, the print controlling method comprising:
    displaying a setting screen on a display section provided in the control apparatus, the setting screen being for inputting therefrom setting information in regard to a post-processing use page including a reference mark to be used for post processing, wherein the reference mark is positioned in a location identifying where post processing is to be conducted on document pages separate from the post-processing use page;
    creating print data that includes data describing images of the document pages that serves as a printing object and the setting information inputted from the setting screen;
    transmitting the print data from the control apparatus to the image forming apparatus through the communication network;
    generating first image data representing first images to be printed on the document pages and second image data representing a second image to be printed on the post-processing use page, based on the print data transmitted from the control apparatus to the image forming apparatus; and
    printing the first images of the document pages, based on the first image data, and the second image of the post-processing use page, based on the second image data, onto first paper sheets and a second paper sheet being separate from the first paper sheets, respectively.

8. The print controlling method of claim 7, wherein the setting screen includes a column for determining whether or not the post-processing use page should be outputted and another column for selecting an output position at which the post-processing use page is to be outputted.

9. The print controlling method of claim 7, wherein the post-processing use page includes information illustrating that a current page itself is the post-processing use page.

10. A print controlling method to be employed in an image forming apparatus, comprising:
    reading an image on each of a plurality of document pages, serving as a printing object, so as to generate first image data representing first images to be printed on the document pages;
    displaying a setting screen on a display section provided in the image forming apparatus, the setting screen being for inputting therefrom setting information in regard to a post-processing use page including a reference mark to be used for post processing, wherein the reference mark is positioned in a location identifying where post processing is to be conducted on the document pages which are separate from the post-processing use page;
    generating second image data representing a second image to be printed on the post-processing use page, based on the setting information inputted from the setting screen; and
    printing the first images of the document pages, based on the first image data, and the second image of the post-processing use page, based on the second image data, onto first paper sheets and a second paper sheet being separate from the first paper sheets, respectively.

11. The print controlling method of claim 10, wherein the setting screen includes a column for determining whether or not the post-processing use page should be outputted and another column for selecting an output position at which the post-processing use page is to be outputted.

12. The print controlling method of claim 10, wherein the post-processing use page includes information illustrating that a current page itself is the post-processing use page.

13. The computer readable storage medium of claim 1, wherein the setting screen includes an output image display for displaying an image to be outputted on the post-processing use page.

14. The image forming apparatus of claim 4, wherein the setting screen includes an output image display for displaying an image to be outputted on the post-processing use page.

15. The print controlling method of claim 7, wherein the setting screen includes an output image display for displaying an image to be outputted on the post-processing use page.

16. The print controlling method of claim 10, wherein the setting screen includes an output image display for displaying an image to be outputted on the post-processing use page.

17. The computer readable storage medium of claim 1, wherein the reference mark location on the post-processing use page corresponds exactly to a location on each of the document pages where post-processing is to be conducted on the documents pages.

18. The image forming apparatus of claim 4, wherein the reference mark location on the post-processing use page corresponds exactly to a location on each of the document pages where post-processing is to be conducted on the document pages.

19. The print controlling method of claim 7, wherein the reference mark location on the post-processing use page corresponds exactly to a location on each of the document pages where post-processing is to be conducted on the document pages.

20. The print controlling method of claim 10, wherein the reference mark location on the post-processing use page corresponds exactly to a location on each of the document pages where post-processing is to be conducted on the document pages.

* * * * *